United States Patent
Watanabe et al.

(10) Patent No.: US 7,953,302 B2
(45) Date of Patent: May 31, 2011

(54) IMAGE PROCESSING METHOD AND IMAGE PROCESSING COMPUTER PROGRAM

(75) Inventors: Ryoji Watanabe, Kanagawa (JP); Akihiko Takada, Kanagawa (JP); Masayoshi Sakakibara, Kanagawa (JP); Hajime Kishimoto, Kanagawa (JP); Yasuo Horino, Tokyo (JP); Toshiyuki Yano, Kanagawa (JP); Yasuhiro Matsuo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 622 days.

(21) Appl. No.: 12/010,720

(22) Filed: Jan. 29, 2008

(65) Prior Publication Data

US 2009/0002731 A1    Jan. 1, 2009

Related U.S. Application Data

(62) Division of application No. 10/647,301, filed on Aug. 26, 2003, now Pat. No. 7,356,205.

(30) Foreign Application Priority Data

Aug. 28, 2002    (JP) .................................. 2002-248787

(51) Int. Cl.
*G06K 9/20*     (2006.01)
*H04N 1/40*     (2006.01)
*G06F 15/00*    (2006.01)

(52) U.S. Cl. ........................................ 382/317; 358/1.9

(58) Field of Classification Search .................. 382/145, 382/164, 167, 173, 176, 180, 181, 190, 198, 382/199, 202, 220, 290, 317; 358/1.9, 2.1, 358/448; 345/33, 92, 98, 100, 636
See application file for complete search history.

(56) References Cited

U.S. PATENT DOCUMENTS

| | | | | |
|---|---|---|---|---|
| 4,581,649 A | * | 4/1986 | Morokawa | 348/219.1 |
| 4,965,747 A | * | 10/1990 | Ohtsuka et al. | 358/1.7 |
| 5,165,072 A | | 11/1992 | Kurita et al. | |
| 6,396,464 B2 | * | 5/2002 | Yokota et al. | 345/33 |
| 6,735,337 B2 | * | 5/2004 | Lee et al. | 382/220 |
| 6,924,782 B1 | * | 8/2005 | Fujioka et al. | 345/92 |
| 7,356,205 B2 | * | 4/2008 | Watanabe et al. | 382/317 |
| 2004/0109194 A1 | * | 6/2004 | Yano | 358/1.14 |

(Continued)

FOREIGN PATENT DOCUMENTS

JP    A-09-150563    6/1997

(Continued)

OTHER PUBLICATIONS

English-language Translation of Japanese Office Action, dated Nov. 21, 2007.

(Continued)

*Primary Examiner* — Amir Alavi
(74) *Attorney, Agent, or Firm* — Oliff & Berridge, PLC

(57) ABSTRACT

Information indicating an area of an image and information indicating attributes of the image have been stored in an IC chip attached to an original paper. When a copying apparatus performs a character recognition process operation with respect to an image displayed on the original paper, the copying apparatus reads the information related to the area of the image and the information related to the attribute of this area from the IC chip attached to this original paper. Then the copying apparatus separates an area where a character is displayed therefrom. The copying apparatus executes the character recognition process operation with respect to the image of the separated area.

2 Claims, 13 Drawing Sheets

U.S. PATENT DOCUMENTS

2009/0002731 A1 * 1/2009 Watanabe et al. .............. 358/1.9

FOREIGN PATENT DOCUMENTS

| JP | A-11-025209 | 1/1999 |
| JP | A 2000-285203 | 10/2000 |
| JP | B2-3176052 | 4/2001 |
| JP | A 2001-134672 | 5/2001 |
| JP | A 2001-148000 | 5/2001 |
| JP | A 2001-229199 | 8/2001 |
| JP | A 2001-260580 | 9/2001 |
| JP | A 2001-283011 | 10/2001 |

OTHER PUBLICATIONS http://pcweb.mycom.co.jp/news/2001/07/22.html.

* cited by examiner

| AREA DATA | ATTRIBUTE DATA |
|---|---|
| X: 3 - 20<br>X: 5 - 15 | TEXT |
| X: 3 - 20<br>X: 16 - 36 | PICTURE |
| ⋮ | ⋮ |

FIG. 11

| AREA DATA | ATTRIBUTE DATA | CONTENT |
|---|---|---|
| X: 3 - 20<br>X: 5 - 15 | TEXT | NEW PRODUCT INFORMATION |
| X: 3 - 20<br>X: 16 - 36 | PICTURE | PRINT620.bmp |
| . . . | . . . | . . . |

IMAGE PROCESSING METHOD AND IMAGE PROCESSING COMPUTER PROGRAM

INCORPORATION BY REFERENCE

This application is a division of U.S. application Ser. No. 10/647,301, filed Aug. 26, 2003 now U.S. Pat. No. 7,356,205, which claims priority benefit to Japanese Patent Application No. 2002-248787 filed on Aug. 28, 2002, which is incorporated herein by reference in its entirety.

BACKGROUND

1. Field of the Invention

The present invention relates to an image processing system and an image processing method, which can support an image processing operation by using a non-contact memory attached to an original document.

2. Description of the Related Art

A compact semiconductor chip (for example, μ-chip by HITACHI, LTD.) from which an external unit can read stored data in a non-contact manner has been known.

Also, JP-A-2001-229199, JP-A-2000-285203, JP-A-2001-134672, JP-A-2001-283011, JP-A-2001-148000, and JP-A-2001-260580 disclose applications of the compact semiconductor chip.

SUMMARY

The present invention has been made from the viewpoint of the above-explained technical background, and therefore, has an object to provide an image processing system and an image processing method, which can perform processing operations, which are adapted to a text image contained in an image and a picture image, respectively, while utilizing a semiconductor chip from which data stored therein can be read in a non-contact manner.

Next, a description will now be given on an image processing system according to the invention.

It should be understood that the invention is not limited to the following description.

In an image processing system according to the invention, for instance, one or more sorts of images (characters, bar codes, hand-written characters, drawings, pictures etc.) are displayed on a paper document (namely, image display member), the image of which is to be read.

A data supply device contained in the paper original corresponds to, for example, a semiconductor chip from which data stored thereinto can be read by using electromagnetic waves.

The semiconductor chip is attached to the paper original in an embedding manner, or the like. In a first image processing system according to the invention, a position and an area (area data) with respect to each of sorts of images displayed on the paper original are recorded in association with attributes (attribute data) of the sorts.

In this case, the attributes may include an attribute (for example, character, numeral, symbol, which are printed out by predetermined font) of a text, an attribute (for instance, drawing and photograph) of a picture, an attribute (portion where image is not displayed) of a blank, and so on.

In other words, one or more sorts of images are displayed on the paper original, e.g., a text image (namely, image of character) having an attribute of a text, and a picture image (namely, image of drawing, and image of photograph) having an attribute of a picture.

Also, in second and third image processing systems according to the invention, the semiconductor chip may store thereinto data (contents data) such as texts and pictures, which constitute an image to be displayed.

An image processing apparatus is, for instance, a copying machine, which reads an image from the paper original by way of a scanner (image read unit), performing a predetermined image process operation with respect to the read image, and printing the processed image.

A data read unit reads the area data and the like from the semiconductor chip via an antenna, which is arranged in the vicinity of the paper document by employing electromagnetic waves.

An image process unit separates either a text image or a picture image based upon the area data, and then, executes an image processing operation with respect to the separated text image or the separated picture image in accordance with the attribute thereof.

For instance, the image process unit performs a character recognition process operation in which an OCR process operation is performed with respect to the text image to recognize a character, which constitutes the text image.

Alternatively, the image process unit performs an image correcting process operation with respect to the picture image, in which reproducibility of half tone gradation may be given a priority.

It should also be understood that the image process unit may carry out a process operation in correspondence with an attribute of an image (for example, blank portion within image) from which both the text image and the picture image have been separated.

Also, a correspondence judging unit employed in the second image processing system judges as to whether or not the text data (contents data) read from the semiconductor chip corresponds to the image read by the scanner.

For example, the correspondence judgment unit recognizes a character, which constitutes the image read by the scanner based upon this image read by the scanner, and then, compares this recognized character with the text data read from the semiconductor chip in order to judge whether or not this recognized character corresponds to the text data.

When the recognized character does not correspond to the text data, the image process unit executes the image processing operation by giving the text data read from the semiconductor chip a top priority.

Also, a contents data production unit employed in the third image processing system recognizes, for example, a text and a picture from the image read by the scanner, and then, extracts them as contents data.

Specifically, the contents data production unit produces the text data by performing, for example, an OCR process operation with respect to an image.

It should also be noted that when the contents data is not read from the semiconductor chip, the contents data production unit produces the contents data, whereas in other cases, the contents data production unit need not produce the contents data.

Image Display Member/Image Processing Apparatus

An image display member and an image processing apparatus according to the present invention correspond to the image display member and the image process apparatus, which are employed in any one of the first to third image processing systems.

Image Processing Method

Also, a first image process method uses an image display member on which at least one sort of image is displayed. The first image process method includes supplying to an external, area data indicating an area of an image display member in which the at least one sort of image is displayed and attribute data indicating attributes of the at least one sort of image, reading the displayed image, reading the supplied area data and the supplied attribute data, separating the at least one sort of image from the read image on the basis of the read area data, and performing an image processing with respect to the separated at least one sort of image in response to the attributes of the at least one sort of image on the basis of the read attribute data.

A second image process method uses an image display member on which an image is displayed. The second image process method includes supplying to an external, content data indicating at least a part of the displayed image, reading the displayed image, reading the supplied content data, judging whether the read image and the read content data correspond to each other, and when the correspondence judgment unit judges that there is a portion of the image display member where the read image and the read content data does not correspond to each other, selecting one of the image read from the portion and the content data corresponding to the portion.

A third image process method uses an image display member on which an image is displayed. The third image process method includes supplying content data indicating the image to an external, reading the displayed image, reading the supplied content data, and producing the content data from the read image in a case other than that the content data has been read.

A first program makes a computer of an image process apparatus execute the following process. The process includes reading an image displayed on an image display member, reading area data indicating an area in which at least one sort of image is displayed and attribute data indicating an attribute of the at least one of the image, separating the at least one sort of image from the read image on the basis of the read area data, and performing an image processing with respect to the separated at least one sort of image in response to the attribute of the at least one sort of image on the basis of the read attribute data.

A second program makes a computer of an image process apparatus execute the following process. The process includes reading an image displayed on an image display member, reading content data indicating at least a part of the displayed image from the image display member, judging whether the read image and the read content data correspond to each other, and when it is judged that there is a portion of the image display member where the read image and the read content data does not correspond to each other, selecting one of the image read from the portion and the content data corresponding to the portion.

A third program makes a computer of an image process apparatus execute the following process. The process includes reading an image displayed on an image display member, reading content data indicating the image from the image display member, and producing the content data from the read image in a case other than that the content data has been read.

BRIEF DESCRIPTION OF THE DRAWINGS

FIG. 11 is a diagram for showing a modified example of data which is stored in the IC chip.

DETAILED DESCRIPTION OF EMBODIMENTS

First Embodiment

Now, a description will be made on a first embodiment of the invention.

Copying Apparatus

Figure 1:
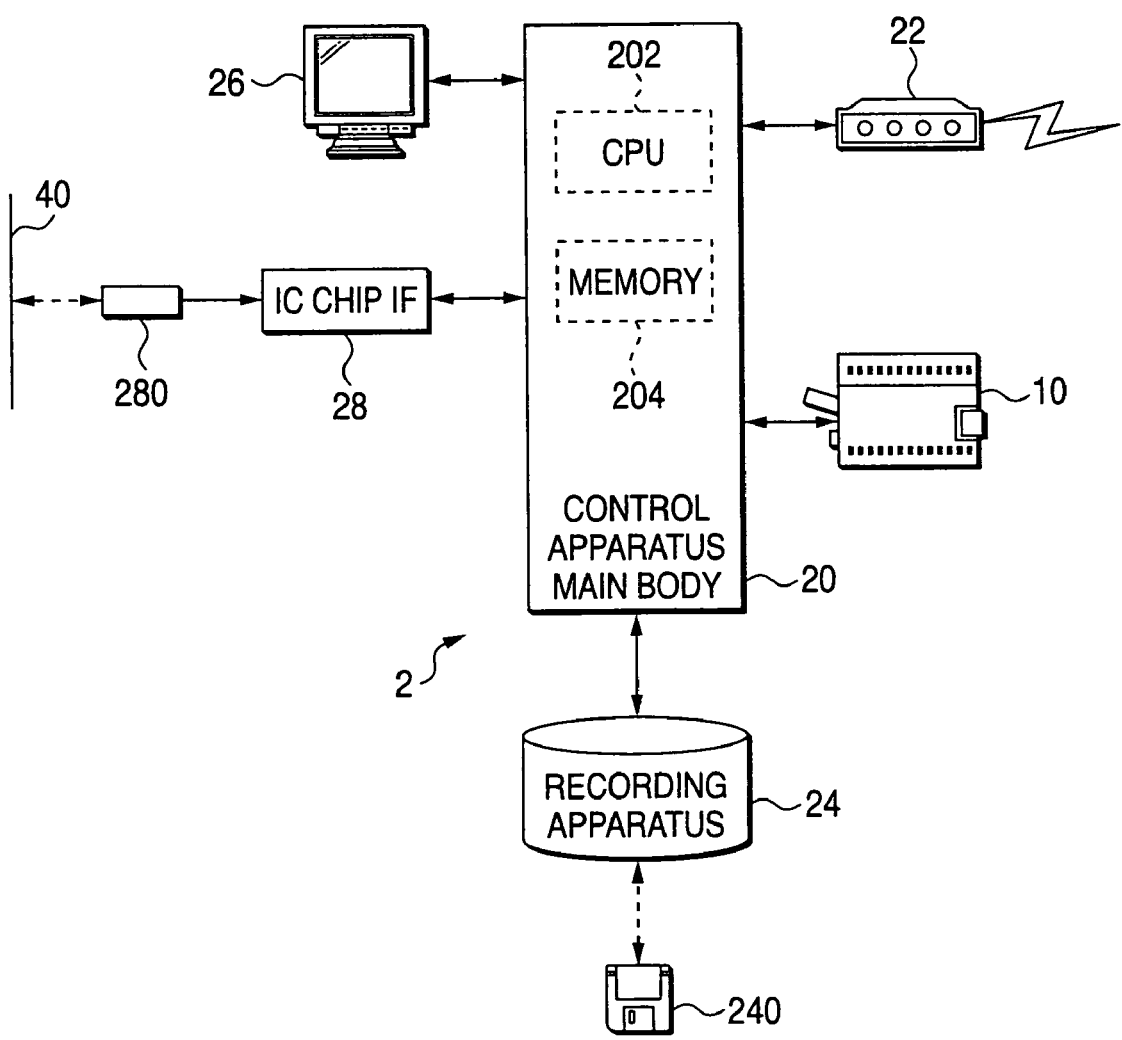
FIG. 1 is a diagram for indicating a hardware structure of a copying apparatus to which an image processing method of the present invention is applied, i.e., for mainly exemplifying a control apparatus thereof.

FIG. 1 is a diagram for showing a hardware structure of a copying apparatus 1 to which an image processing method according to the invention is applied, while mainly showing a control apparatus 2 thereof.

As shown in FIG. 1, the copying apparatus 1 includes the control apparatus 2 and a copying apparatus main body 10.

The control apparatus 2 includes a control apparatus main body 20, a communication apparatus 22, a recording apparatus 24 such as an HDD/CD apparatus, a user interface apparatus (UI apparatus) 26, and an IC chip interface (IC chip IF) 28. The control apparatus main body 20 contains a CPU 202, a memory 204, and the like. The user interface apparatus 26 contains either an LCD display apparatus or a CRT display apparatus, and a keyboard/touch panel, and so on. The IC chip interface 28 contains an antenna 280.

Copying Apparatus Main Body 10

Figure 2:
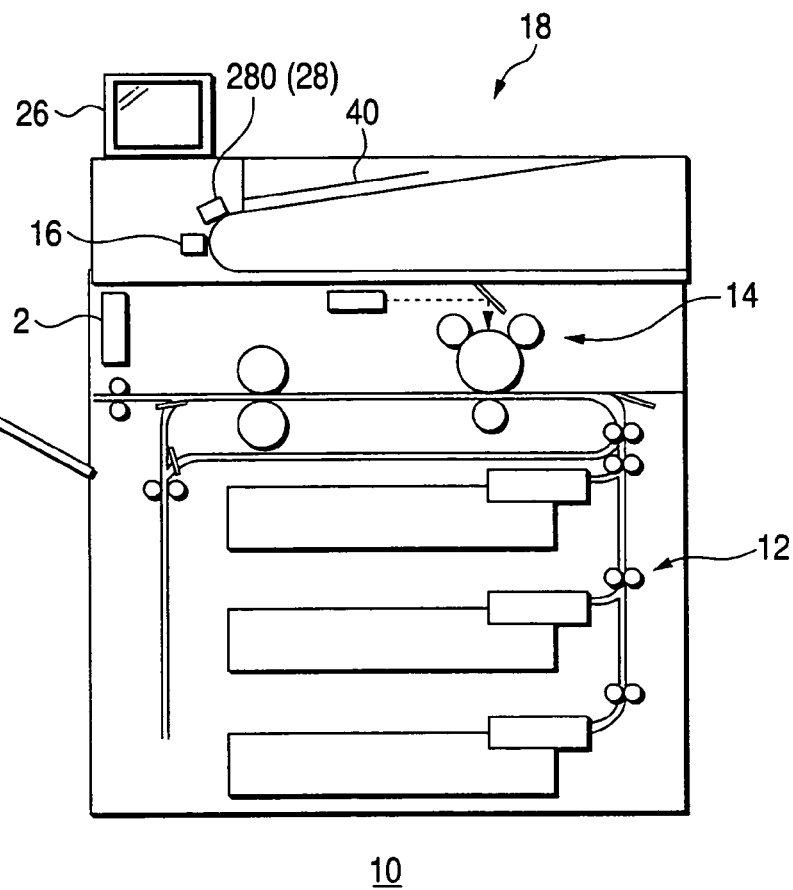
FIG. 2 is a diagram for exemplifying a hardware construction of a copying apparatus main body indicated in FIG. 1.

FIG. 2 is a diagram for showing an example of a hardware structure of the copying apparatus main body 10 indicated in FIG. 1.

As shown in FIG. 2, the copying apparatus main body 10 includes a paper tray unit 12, a print engine 14, a scanner 16, an original feeding apparatus 18, and the like. The print engine 14 prints an image on a printing paper 42 by way of the xerography technique and the like. The scanner 16 reads an image of the original paper 40. The original feeding apparatus 18 feeds the original paper 40.

Also, in the copying apparatus main body 10, both the IC chip IF 28 and the antenna 280 are arranged in the vicinity of an original feeding path through which the original paper 40 is fed by the original feeding apparatus 18. Also, the UI (user interface) apparatus 26 is arranged at an upper portion of the first copying apparatus main body 10.

In other words, the copying apparatus 1 may be realized by employing such a hardware structure that both the IC chip IF 28 and the antenna 280 are additionally provided in a general-purpose copying apparatus for reading an image of the original paper 40 fed from the original feeding apparatus 18 and performing an image processing operation to this image to print the processed image.

It should be noted that as shown in FIG. 2, the control apparatus 2 (see FIG. 1) is actually stored inside the copying apparatus main body 10.

Original Paper 40

Figure 3:
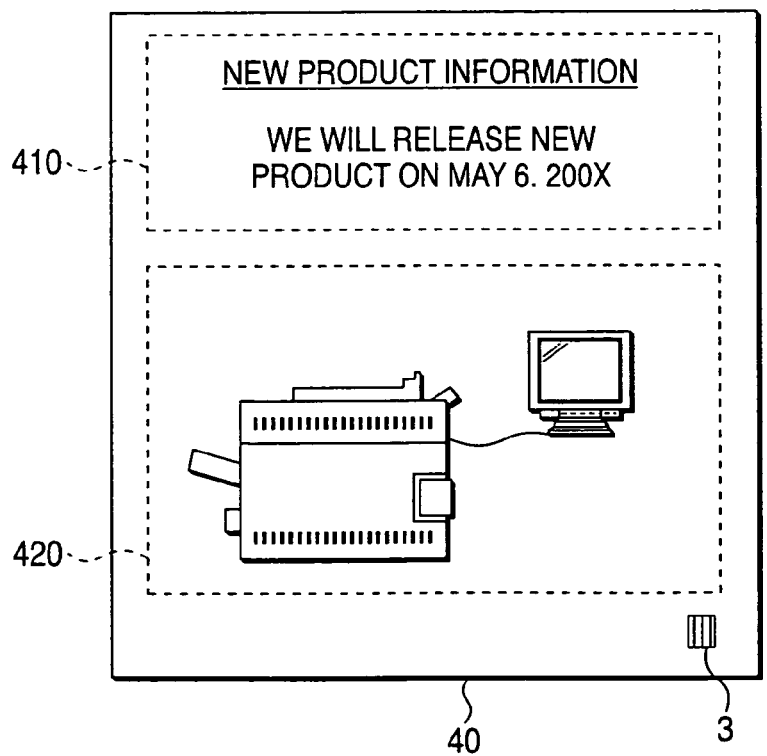
FIG. 3 is a diagram for exemplifying an original paper shown in FIG. 1 and FIG. 2.

FIG. 3 is a diagram for showing an example of the original paper 40 shown in FIG. 1 and FIG. 2. As shown in FIG. 3, an IC chip 3 is attached to the original paper 40 in an embedding method, or the like.

A text area 410 and an image area 420 are provided on a surface of the original paper 40. The text area 410 is an area on which one or more image is displayed, for example, a text image printed with a preliminarily designated font is displayed. On the image area 420, a picture image such as a photograph and a handwritten character is displayed.

Figures 4, 5:
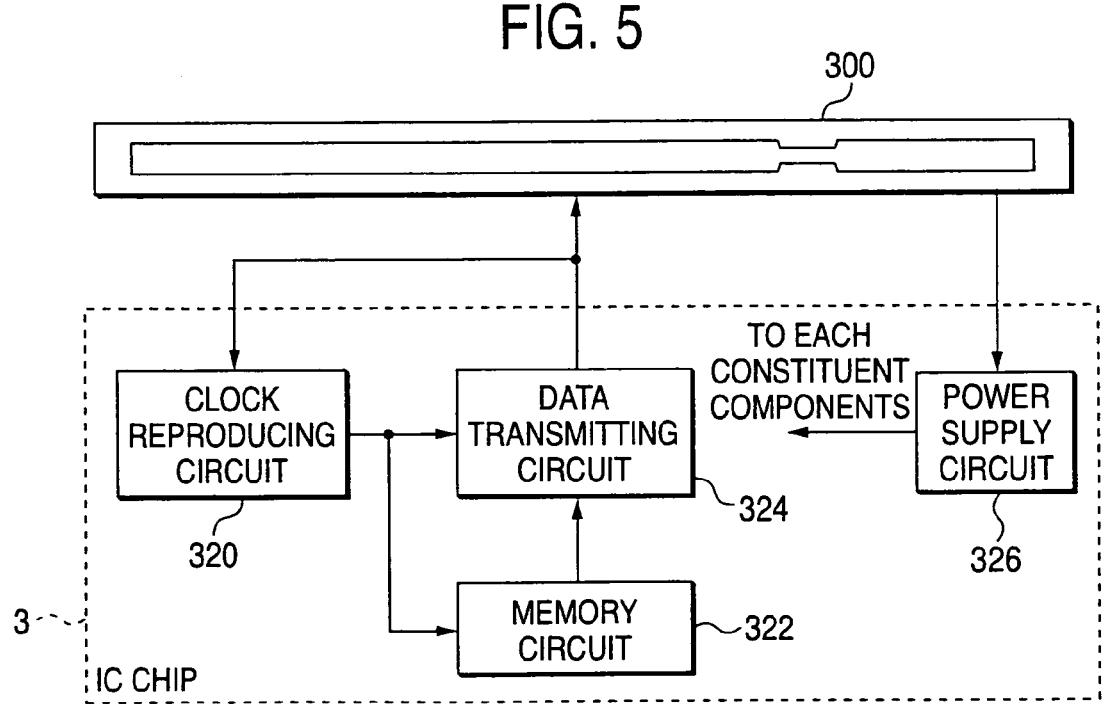
FIG. 4 is a diagram for exemplifying information which is stored into a first IC chip attached to the original paper shown in FIG. 3.
FIG. 5 is a diagram for showing a structure of the first IC chip indicated in FIG. 3.

FIG. 4 is a diagram for showing an example of information, which is stored in the IC chip 3 attached to the original paper 40 shown in FIG. 3.

As shown in FIG. 4, area data indicating the area where the text image is displayed or the area where the picture image is displayed are stored while the area data are associated with attributes (for example, a text, a picture, or the like) of the image displayed in the area.

In this example, the area data indicates the area by using coordinate values in the original paper 40.

IC Chip 3/IC Chip IF 28

FIG. 5 is a diagram for schematically showing a structure of the first IC chip 3 shown in FIG. 3.

Figure 6:
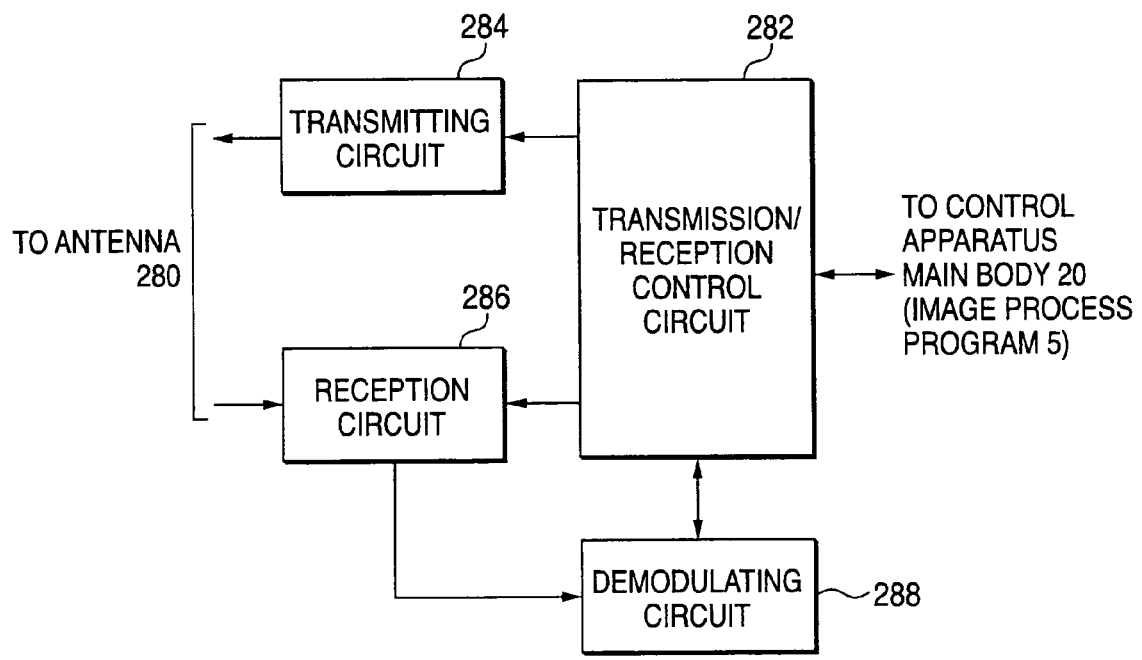
FIG. 6 is a diagram for indicating a structure of an IC chip IF shown in FIG. 1 and FIG. 2.

FIG. 6 is a diagram for schematically showing a structure of the IC chip IF 28 shown in FIG. 1 and FIG. 2.

As shown in FIG. 5, the IC chip 3 includes an antenna 300, a clock reproducing circuit 320, a memory circuit 322, a data transmitting circuit 324, and a power supply circuit 326.

It should also be noted that when it is so guaranteed that the IC chip 3 of the original paper 40 passes through an area in close proximity to the antenna 280, the IC chip 3 having no antenna 300 may be employed.

Also, as shown in FIG. 6, the IC chip IF 28 includes a transmission circuit 284, a reception circuit 286, a transmission/reception control circuit 282, and a demodulation circuit 288.

In accordance with the below-mentioned operations of the respective constituent components in the IC chip 3 and the IC chip IF 28, information (data), which has been stored in the IC chip 3, is read therefrom by the IC chip IF 28 in a non-contact manner.

In the IC chip 3 (see FIG. 5), the power supply circuit 326 (FIG. 5) rectifies an electromagnetic wave signal supplied via the antenna 300 so as to supply electric power to the respective constituent components of the IC chip 3, while this electric power is required for these constituent components.

The clock reproducing circuit 320 reproduces a clock signal from the electromagnetic wave signal supplied via the antenna 300 from the IC chip IF 28, and then, outputs this reproduced clock signal to the memory circuit 322 and the data transmitting circuit 324.

The memory circuit 322 outputs data indicating the information (see FIG. 4) stored therein to the data transmitting circuit 324 in synchronization with the clock signal input from the clock reproducing circuit 320.

The data transmitting circuit 324 changes a reflection intensity of an electromagnetic wave signal supplied from the IC chip IF 28 in accordance with a value of data input from the memory circuit 322 in synchronization with the clock signal input from the clock reproducing circuit 320.

As explained above, the data indicating the information, which has been stored in the memory circuit 322, is transmitted from the IC chip IF 28 to the IC chip 3 by changing the intensity of the reflection signal of the electromagnetic wave signal, which is transmitted from the IC chip IF 28 to the IC chip 3.

In the IC chip IF 28 (FIG. 6), the transmission/reception control circuit 282 controls operations of the respective constituent components of the IC chip IF 28.

Also, this transmission/reception control circuit 282 outputs to the control apparatus main body 20 (namely, a first image processing program 5, which will be discussed later with reference to FIG. 7), data indicating the area data, which has been received by the reception circuit 286 and then has been demodulated by the demodulation circuit 288.

The transmission circuit 284 transmits the electromagnetic wave signal containing the clock signal via the antenna 280 to the IC chip 3.

The reception circuit 286 receives a reflection signal, which is reflected from the IC chip 3 side, and then outputs this received reflection signal to the demodulation circuit 288.

The demodulation circuit 288 demodulates the data transmitted from the IC chip 3 based upon a change of the reflection signal input from the reception circuit 286, and then outputs the demodulated data to the transmission/reception control circuit 282.

First Image Processing Program 5

Figure 7:
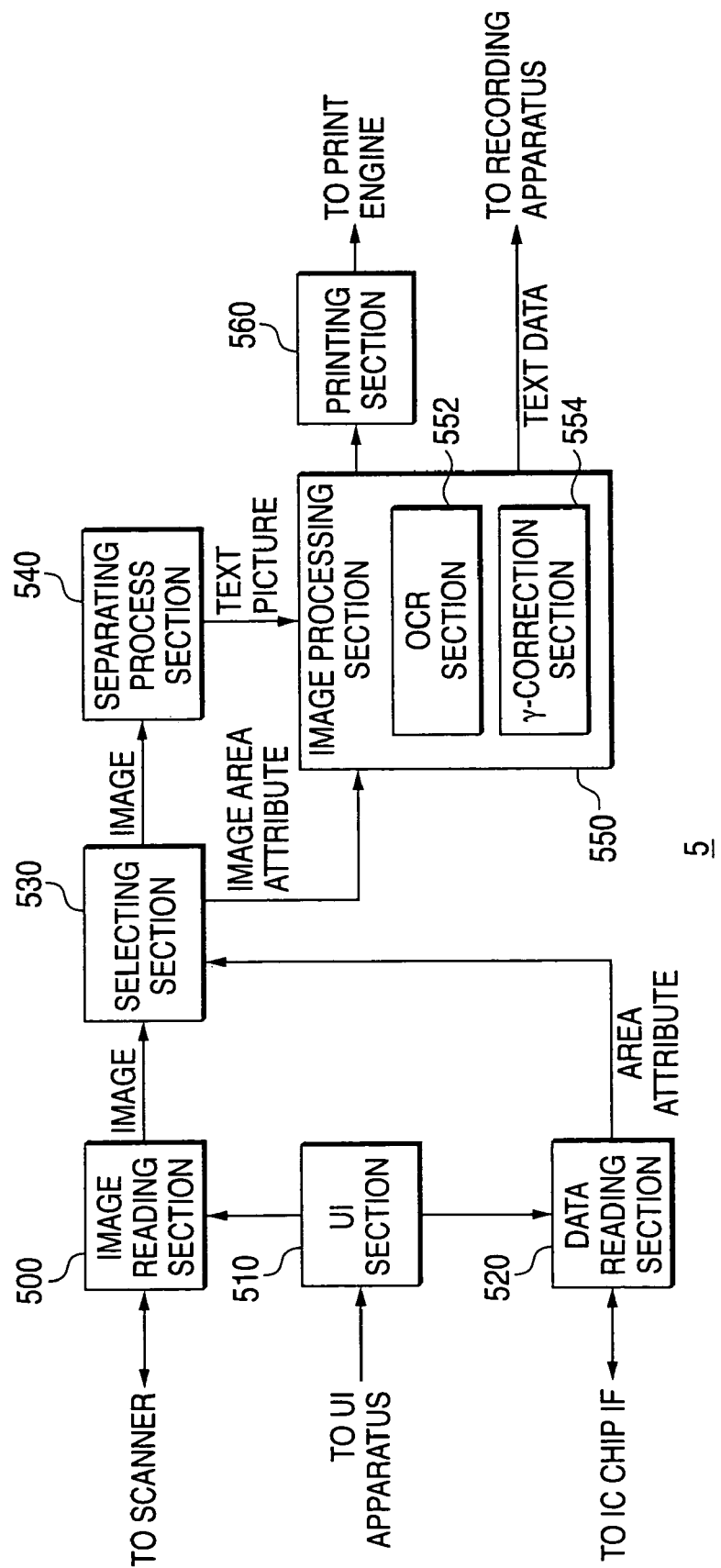
FIG. 7 is a diagram for showing a structure of a first image processing program which is executed by the control apparatus 2 (FIG. 1 and FIG. 2) so as to realize the image processing method according to the present invention.

FIG. 7 is a block diagram for schematically showing a structure of a first image processing program 5, which is executed by the control apparatus 2 (see FIGS. 1 and 2) so as to realize the image processing method according to the invention.

As shown in FIG. 7, the image processing program 5 includes an image reading section 500, a UI section 510, a data reading section 520, a selecting section 530, a separating process section 540, an image processing section 550, and a printing section 560.

The first image processing program 5 is supplied via, for example, a recording medium 240 (see FIG. 1) to the control apparatus 2, and is loaded to the memory 204 so as to be executed.

In the first image processing program 5, the image reading section 500 controls the constituent component of the copy apparatus main body 10 such as the scanner 16 (FIG. 2) to read an original image of the original paper 40 (FIG. 3) and to output the read image to the selecting section 530.

The UI section 510 receives an operation by a user with respect to the UI apparatus 26 (FIGS. 1 and 2), instructs the image reading section 500 to read an image, and instructs the data reading section 520 to read data from the IC chip 3.

It should also be understood that the following case is taken for a specific example. That is, when the user of the copying apparatus 1 inputs data for instructing the UI apparatus 26 to execute an image processing operation and performs a commencement of copying operation, the first image processing program 5 reads an image of the original paper 40, executes an image processing operation such as a character recognition processing operation with respect to this read image, and thereafter, prints this processed image.

The data reading section 520 controls the IC chip IF 28 to read the area data and the attribute data (see FIG. 4) from the IC chip 3, and then outputs the read area data and the read attribute data to the selecting section 530.

When the selecting section 530 receives the area data and the attribute data, the selecting section 530 outputs the image input from the image reading section 500 together with both the area data and the attribute data to the image processing section 550. In other cases, the selecting section 530 outputs the image input from the image reading section 500 to the separating process section 540.

The separating process section 540 executes a separation processing operation for separating the text image and the picture image from the image read by the image reading section 500 (this operation will be referred to as "text/picture separating process operation" hereinafter).

For example, the separating process section 540 executes a clustering process operation for surrounding an area in which an image pattern thereof has been recognized as a character, and then, separates the image of this surrounded area as a text image.

Also, the separating process section 540 executes another clustering process operation for surrounding an area in which an image has been detected but an image pattern of a character has not been detected, and then separates the image of this surrounded area as a picture image.

The image processing section 550 contains an OCR section 552 for recognizing a character from an image, and a γ-correction section 554 for performing the γ-correction with respect to a picture.

When the OCR section 552 receives the area data and the attribute data in combination with the image from the selecting section 530, the OCR section 552 performs a separating process operation for separating a text area based upon the area data and the attribute data, recognizes a character from an image of the text area, and then, outputs a font image of the recognized character to the printing section 560. Furthermore, the image processing section 550 outputs text data of the recognized character to the recording apparatus 24 to record the text data on the recording apparatus 24.

On the other hand, when the OCR section 552 receives the separated text image and the separated picture image from the separating process section 540, the OCR section 552 recognizes a character from the separated text image and output a font image of the recognized image to the printing section 560. Further, the OCR section 552 outputs text data of the recognized character to the recording apparatus 24 to record the text data on the recording apparatus 24.

The image processing section 550 reproduces the text image of the character recognized by the OCR section 552 by using a font previously prepared, and synthesizes the reproduced text image with the picture image, and then, outputs the synthesized image to the printing section 560.

Also, the γ-correction section 554 performs the γ correction in which reproducibility of a halftone with respect to a picture image is given priority, and then, outputs the γ-corrected picture image to the printing section 560. Furthermore, the γ-correction section 554 may execute a process operation for increasing the contrast of a text image as a pre-process operation of the character recognizing process operation performed by the OCR section 552 to further facilitate the character recognizing operation by the OCR section 552.

The printing section 560 controls the print engine 14 (FIG. 2) and the like to print the image, which is input from the image processing section 550.

Overall Operation

Next, overall operation of the copying apparatus 1 will be described.

Figure 8:
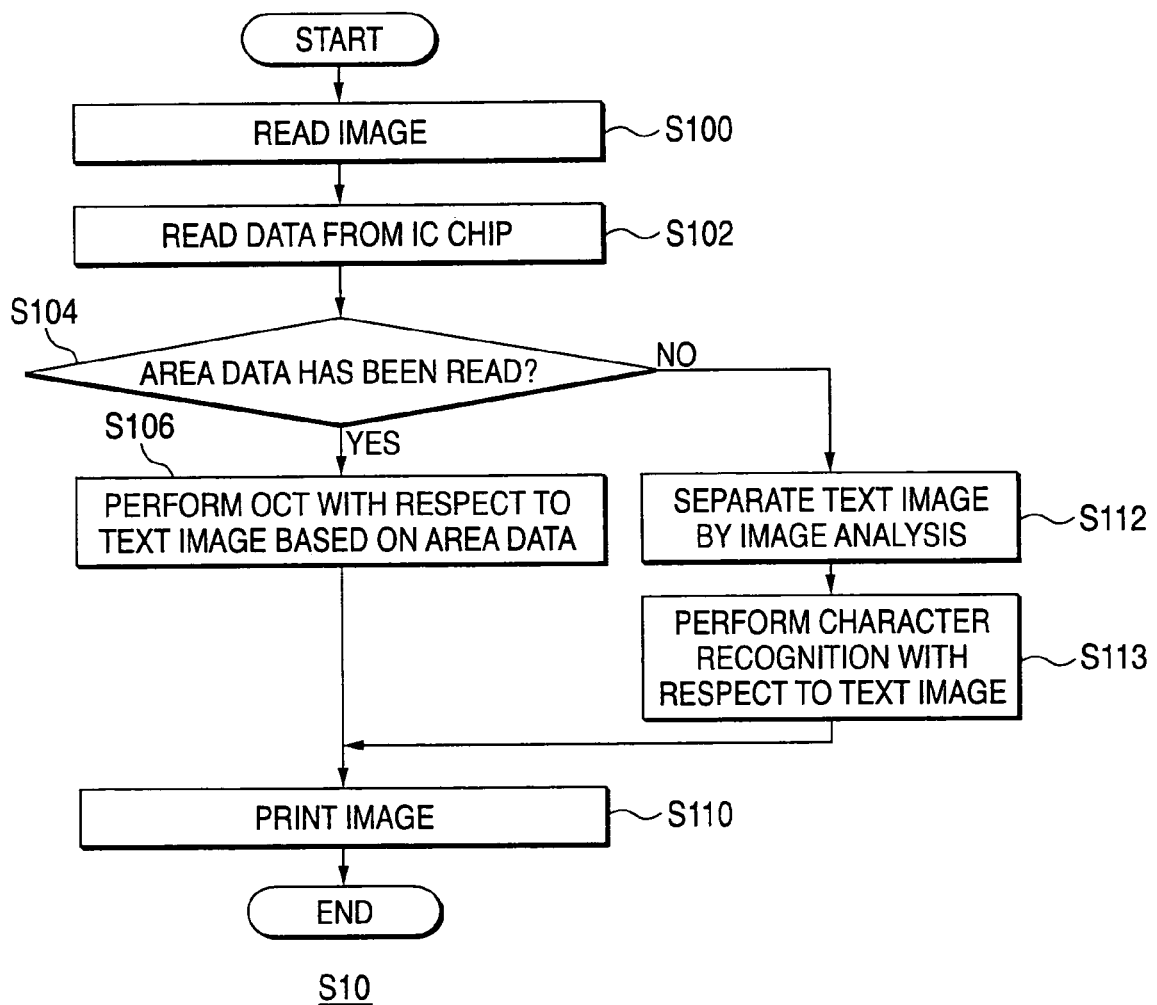
FIG. 8 is a flow chart for indicating a first operation (step S10) of the copying apparatus (first image processing program).

FIG. 8 is a flow chart for describing a first operation (S10) of the copying apparatus 1 (the first image processing program 5).

As shown in FIG. 8, in a step 100 (S100), a user performs an operation required for an image processing operation with respect to the UI apparatus 26 (FIG. 1 and FIG. 2). When the operation for commencing the image processing operation is carried out with respect to the UI apparatus 26, the image reading section 500 controls the scanner 16 to read an image of the original paper 40.

In a step 102 (S102), the data reading section 520 controls the IC chip IF 28 to read data from the IC chip 3 of the original paper 40, which is transported through the original feeding apparatus 18.

In a step 104 (S104), the selecting section 530 judges as to whether or not both area data and attribute data are read from the IC chip 3.

When both the area data and the attribute data are read from the IC chip 3, the first image processing program 5 is advanced to a process operation of a step 106 (S106), whereas in other cases, this first image processing program 5 is advanced to a process operation of a step 112 (S112).

In the step 106 (S106), the OCR section 552 of the image processing section 550 separates a text image based upon the area data and the attribute data, and executes the character recognizing process operation for recognizing a character from the separated text image.

Also, the γ-correction section 554 of the image processing section 550 separates a picture image based on both the area data and the attribute data, and executes the γ correction with respect to the separated picture image.

Finally, the image processing section 550 synthesizes a font image of the recognized character with the picture image, and then outputs the synthesized picture image to the printing section 560.

In a step 110 (S110), the printing section 560 controls the print engine 14 and the like to print the image input from the image processing section 550.

In the step 112 (S112), the separating process section 540 executes the text/picture separating operation with respect to the image input from the selecting section 530.

In a step 113 (S113), the OCR section 552 of the image processing section 550 executes the OCR processing operation with respect to the separated text image to perform the character recognizing process operation.

The γ-correction section 554 of the image processing section 550 performs the γ correction with respect to the separated picture image. Finally, the image processing section 550 synthesizes the font image of the character discriminated by the OCR processing operation with the image of the image area, and then, outputs the synthesized image to the printing section 560.

The image output to the printing section 560 is printed in accordance with the process operation of the step 110, which is described above.

As described above, since the copying apparatus 1 recognizes the character constituting the image and reproduces the recognized character by using the font data, which has been previously prepared for this copying apparatus 1, it is possible to prevent deteriorations of the images, which are caused by repeatedly performing the copying operation.

In this case, the character recognizing process operation requires the heavy processing load. Therefore, preferably, at first the text image representing a character is separated and then, the character recognition process operation is executed with respect to only the separated text image.

However, this process operation requires analyzing an image so as to separate the text image and the picture image and therefore is complex. With regard to some images, there is a possibility that text image cannot be completely separated from picture image.

As a consequence, in accordance with the copying apparatus 1 of the first embodiment, since both the area data and the attribute data, which are read from the IC chip 3, are used, the precision of separating the text image from the picture image can be increased. In addition, the work load given to this processing operation can be lowered, as compared with the work load given to the text/picture separating operation by way of the image analyzing operation.

Modification

It should be noted that both the area data and the attribute data, which are stored in the IC chip 3, may be employed as information used to confirm precision of the text/picture separating process operation executed by the separating process section 540.

That is to say, since the results of the text/picture separating operations executed by the separating process section 540 are compared with the area data and the attribute data, which are read from the IC chip 3, the precision of the text/picture separating operation may be confirmed.

In this case, both the area data and the attribute data stored in the IC chip 3 need not be related to the entire image.

Figure 9:
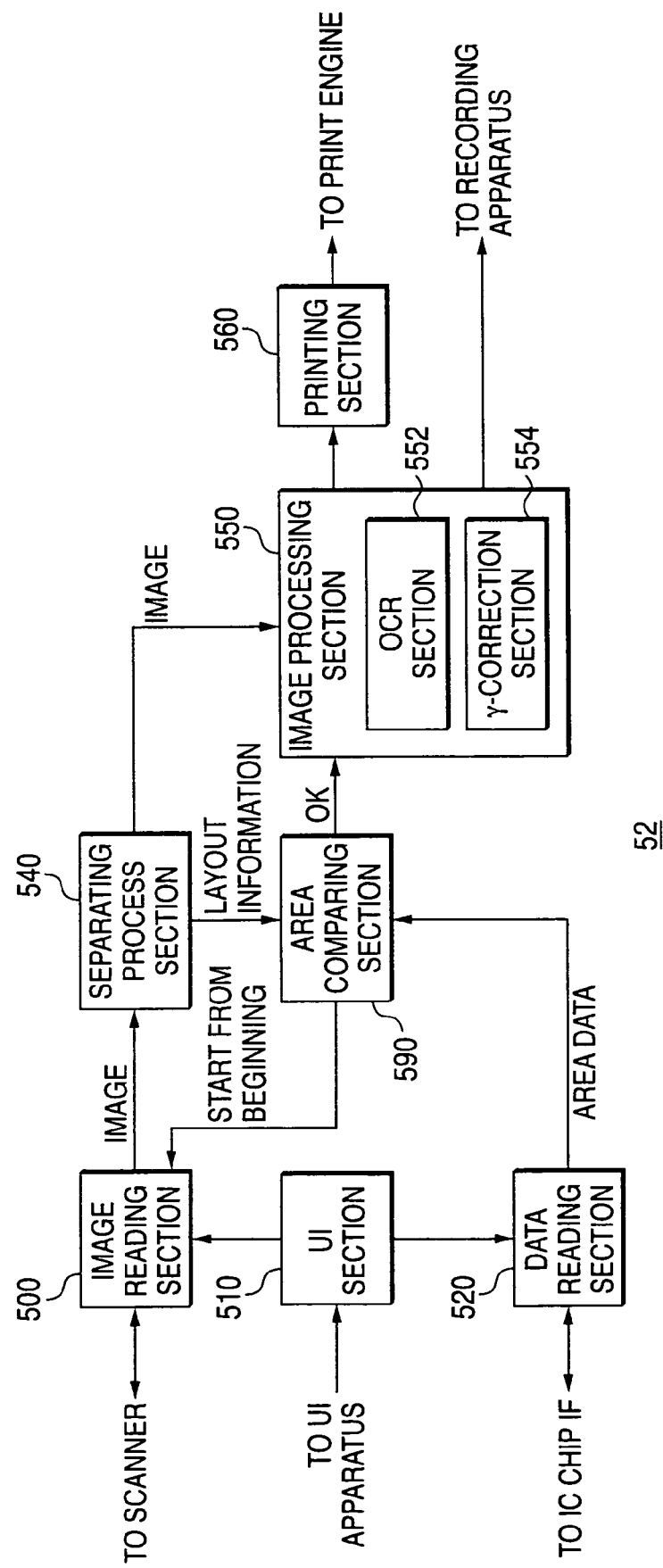
FIG. 9 is a diagram for representing a structure of a second image processing program.

FIG. 9 is a diagram for showing a structure of a second image processing program 52.

As shown in FIG. 9, the second image processing program 52 employs such an arrangement that the selecting section 530 is deleted from the arrangement of the first image processing program 5, and an area comparing section 590 is additionally provided.

It should be understood that with regard to the respective structural elements of the second image processing program 52 similar to those of the first image processing program 5, the same reference numerals are allotted.

In the second image processing program 52, the area comparing section 590 compares a result of text/picture separating operation by the separating process section 540 with both area data and attribute data, which are read by the data reading section 520 in order to judge as to whether or not this separation result correspond to the area data and the attribute data.

In response to a judgment result, the area comparing section 590 instructs the image processing section 550 to perform the image processing operation, or instruct to perform the image reading operation and the separating process operation again.

As described above, when the information read from the IC chip 3 is employed for the confirmation of the text/picture separating process operation, it is sufficient to store the area data and the attribute data, which are related to a part of an image, into the IC chip 3. As a result, this method is suitable for a case in which the storage capacity of the IC chip is small.

Figure 10:
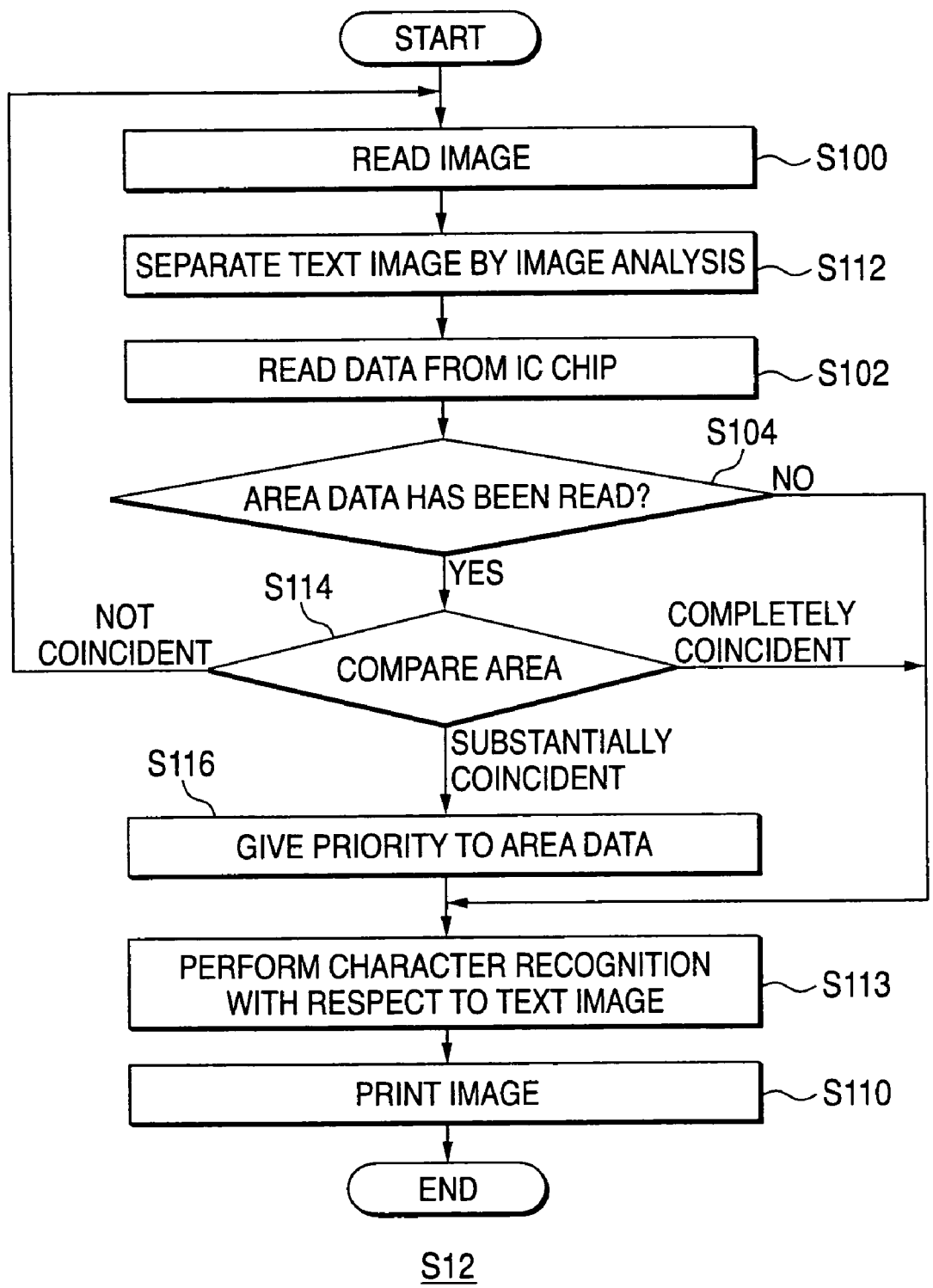
FIG. 10 is a flow chart for indicating a second operation (step S12) of a copying apparatus (second image processing program).

FIG. 10 is a flow chart for describing a second operation (S12) of the copying apparatus 1 (second image processing program 52).

It should also be understood that with regard to the process operations of the second operation shown in FIG. 10 similar to those of the first operation shown in FIG. 8, the same reference numerals are allotted.

In the second operation of the copying apparatus 1, after image data has been read in the process operation of the step S100, the separating process section 540 executes the text/picture separating process operation in the process operation of the step 112 (S112) irrespective of a condition as to whether or not both the area data and the attribute data are read from the IC chip 3.

In a process operation of a step 104 (S104), when the second image processing program 52 judges that both the area data and the attribute data can be read from the IC chip 3, the second image processing program 52 is advanced to a further process operation of a step S114, whereas in other cases, the second images processing program 52 is advanced to another process operation of a step S113.

In the process operation of the step 114 (S114), the area comparing section 590 compares the result of the text/picture separating operation executed by the separating process section 540 with both the area data and the attribute data, which are read from the IC chip 3.

When the area comparing section 590 judges that the text/picture separation result is completely coincident with the area data and the attribute data, the second image processing program 52 is advanced to the process operation of the step S113. When the area comparing section 590 judges that the text/picture separation result is not completely coincident with the area data and the attribute data, but coincident with these data at a level higher than, or equal to a predetermined value, the second image processing program 52 is advanced to a process operation of a step S116. When the area comparing section 590 judges that the coincident portion cannot satisfy the predetermined value, the second image processing program 52 returns to the process operation of the step S100.

In the process operation defined in the step 116 (S116), the image processing section 550 corrects a portion where the text/picture separation result is not coincident with the area data and the attribute data by using the area data and the attribute data.

Similar to the case described with reference to FIG. 8, finally, the image processing section 550 executes an image processing operation in response to the respective attributes with respect to the text image and the picture image, which have been separated from each other, in conjunction with both the OCR section 552 and the γ-correction section 554. Then, the printing section 56 prints an image input from the image processing section 550 (steps S113 and S110).

As described above, the second image processing program 52 can evaluate the result of the text/image separating operation by using the area data and the attribute data, which are read from the IC chip 3.

Second Embodiment

Next, a second embodiment of the present invention will now be explained.

In this second embodiment, while an IC chip 3 attached to an original paper 40 stores thereinto a portion of an image (text data) indicated on this original paper 40, the copying apparatus 1 performs an image correction by using this text data in a case that an image read from the original paper 40 is unclear.

It is so assumed that structures and functions of the copying apparatus 1 and the original paper 40 are essentially same as those of the first embodiment.

FIG. 11 is a diagram for showing a modified example of information, which is stored in the IC chip 3. In this modification example, the IC chip 3 attached to the original paper 40 stores thereinto as contents data a portion of an image displayed on the original paper 40 in addition to both area data and attribute data.

When an attribute can be read from the contents data, the IC chip 3 need not necessarily store the attribute data.

It should be understood that in the following description, it is taken as a specific example that the IC chip 3 stores thereinto text data as the contents data and the image displayed on the original paper 40 is processed by using this text data.

Figure 12:
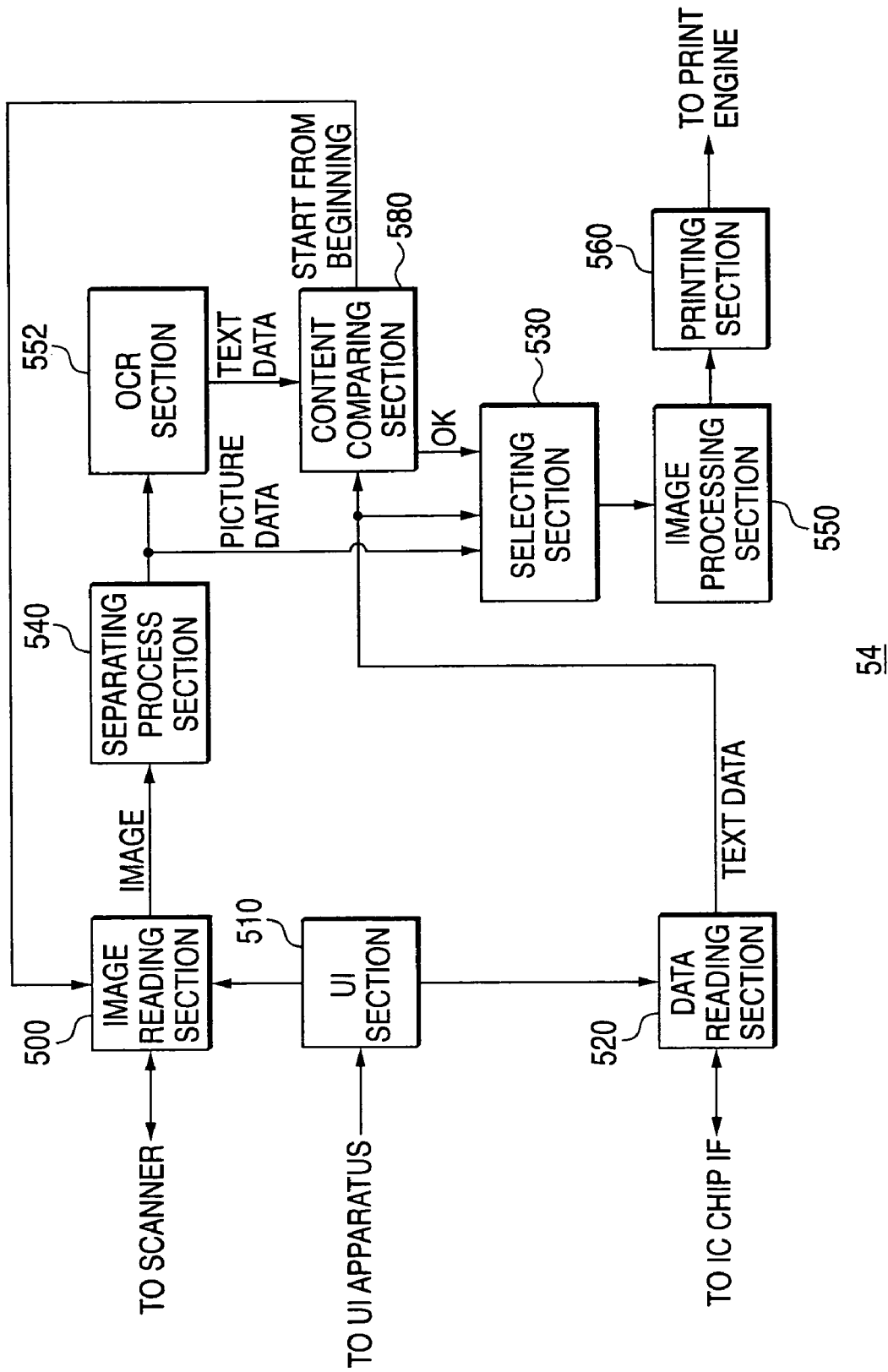
FIG. 12 is a diagram for indicating a structure of a third image processing program.

FIG. 12 is a diagram for showing a structure of a third image processing program 54.

As shown in FIG. 12, the third image processing program 54 includes an OCR section 552, a content comparing section 580, and a selecting section 530 between a separating process section 540 and an image processing section 550.

In the third image processing program 54, the OCR section 552 recognizes a character from a text image, which is separated by the separating process section 540, and then outputs this recognized character as text data to the contents comparing section 580.

The contents comparing section 580 compares the text data of the character recognized by the OCR section 552 with text data read from the IC chip 3.

The selecting section 530 selects either the text data of the character recognized by the OCR section 552 or the text data read from the IC chip 3 in response to a comparison result made by the contents comparing section 580 and then, outputs the selected text data to the image processing section 550.

Figure 13:
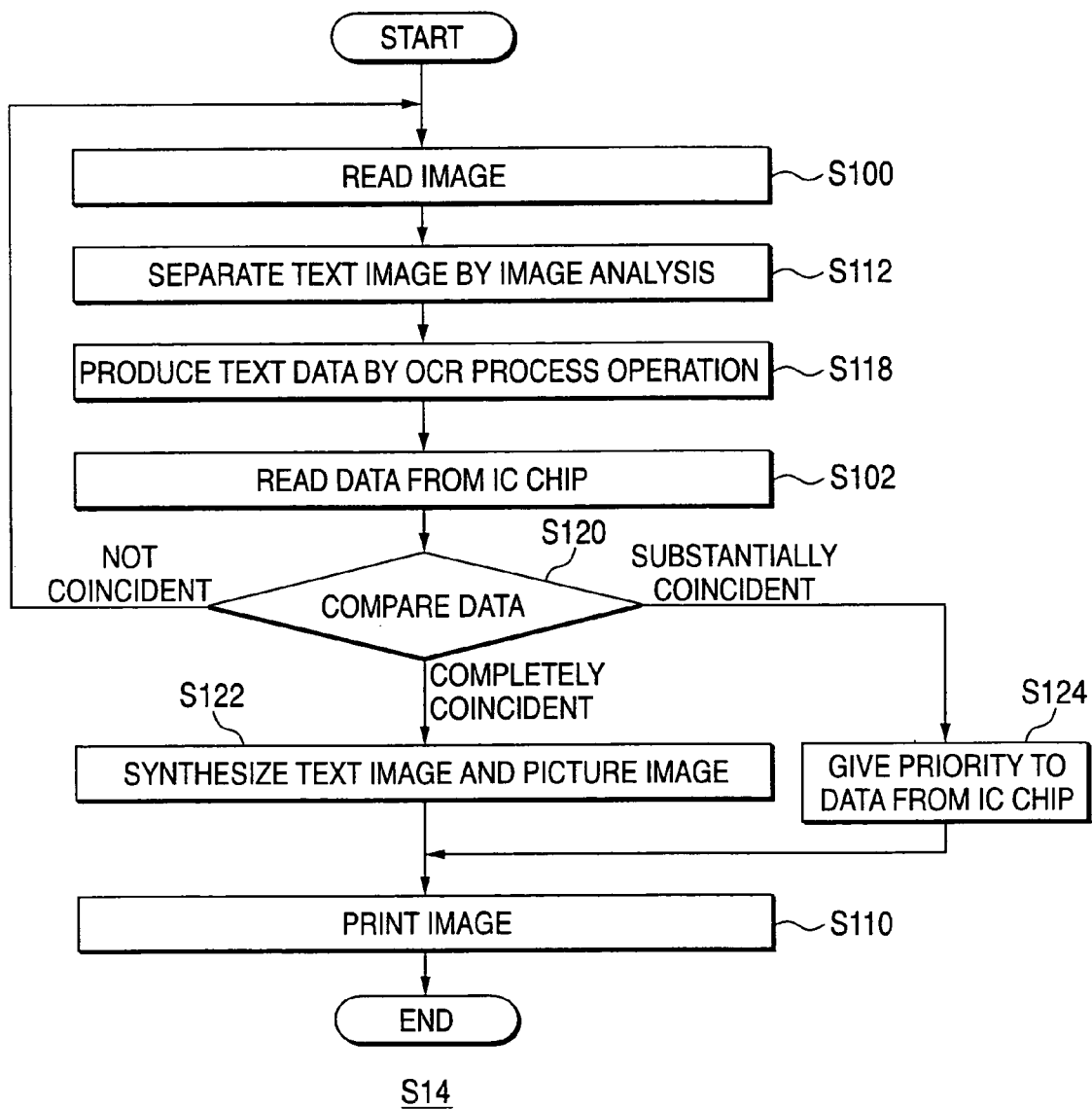
FIG. 13 is a flow chart for describing a third operation (S14) of a copying apparatus (third image processing program).

FIG. 13 is a flow chart for describing a third operation (step S14) of the copying apparatus 1 (third image processing program 54).

It should also be understood that with regard to the process operations of the third operation shown in FIG. 13 similar to those of the first and second operations shown in FIGS. 8 and 10, the same references are allotted.

As shown in FIG. 13, in a process operation of a step 112 (S112), the separating process section 540 separates a text image from a picture image in an image input from an image reading section 500 and then, outputs the text image and the picture image to the selecting section 530 and the OCR section 552.

In a process operation of a step 118 (S118), the OCR section 552 recognizes a character from the text image input from the separating process section 540 and then, outputs both text data of the recognized character and a position of the text data to the contents comparing section 580. Thereafter, the third image processing program 54 is advanced to a process operation of a step S102. In this process operation of the step S102, the data reading section 520 reads both area data and character data from the IC chip 3 and then, outputs both the area data and the character data to the selecting section 530 and the contents comparing section 580. The process operation is advanced to a process operation of a step S120.

In a step 120 (S120), the contents comparing section 580 compares both the text data and the position thereof, which are input from the OCR section 552, with both the character data and the area data, which are input from the data reading section 520.

When the contents comparing section 580 judges that the text data and the position thereof are completely coincident with the character data and the area data, the third image processing program 54 is advanced to a process operation of a step S122.

When the contents comparing section 580 judges that the text data and the position thereof are not coincident with the character data and the area data, but are coincident at a level higher than, or equal to a predetermined value, the third image processing program 54 is advanced to a process operation of a step S124. When the contents comparing section 580 judges that the coincident portion cannot satisfy the predetermined value, the third image processing program 54 returns to the process operation of the step S100.

In the step 122 (S122), the selecting section 530 selects the picture image input from the separating process section 540 and the text data input via the contents comparing section 580 from the OCR section 552 and then, outputs these selected picture image and text data to the image processing section 550. The image processing section 550 synthesizes the picture image input from the selecting section 520 with the font image of the text data, and then outputs the synthesized image to the printing section 560.

On the other hand, in the step 124 (S124), the selecting section 530 selects the picture image input from the separating process section 540 and the text data input from the data reading section 520 and then, outputs these selected picture image and text data to the image processing section 550. The image processing section 550 synthesizes the picture image input from the selecting section 530 with the font image of the text data and then, outputs the synthesized image to the printing section 560.

Similar to the case of FIG. 8, finally, the printing section 560 prints the image input from the image processing section 550 (S110).

As described above, the third image processing program 54 can evaluate the image/picture separation result by using the text data read from the IC chip 3. Also, even when the OCR section 552 cannot sufficiently recognize the character, the third image processing program 54 can execute the image processing operation by using the text data read from the IC chip 3.

For instance, in case that text data constructed of a small character whose readability is easily deteriorated has been stored in the IC chip 3, even when an image quality is lowered by repeatedly performing a copying operation, the copying apparatus 1 can print this small character under readable condition.

Third Embodiment

Next, a third embodiment of the present invention will now be explained.

In this third embodiment, the copying apparatus 1 determines as to whether or not text data is produced from a read image in response to a fact as to whether or not text data can be read from the IC chip 3.

It is so assumed that structures and functions of the copying apparatus 1 and the original paper 40 are essentially same as those of the first embodiment.

Figure 14:
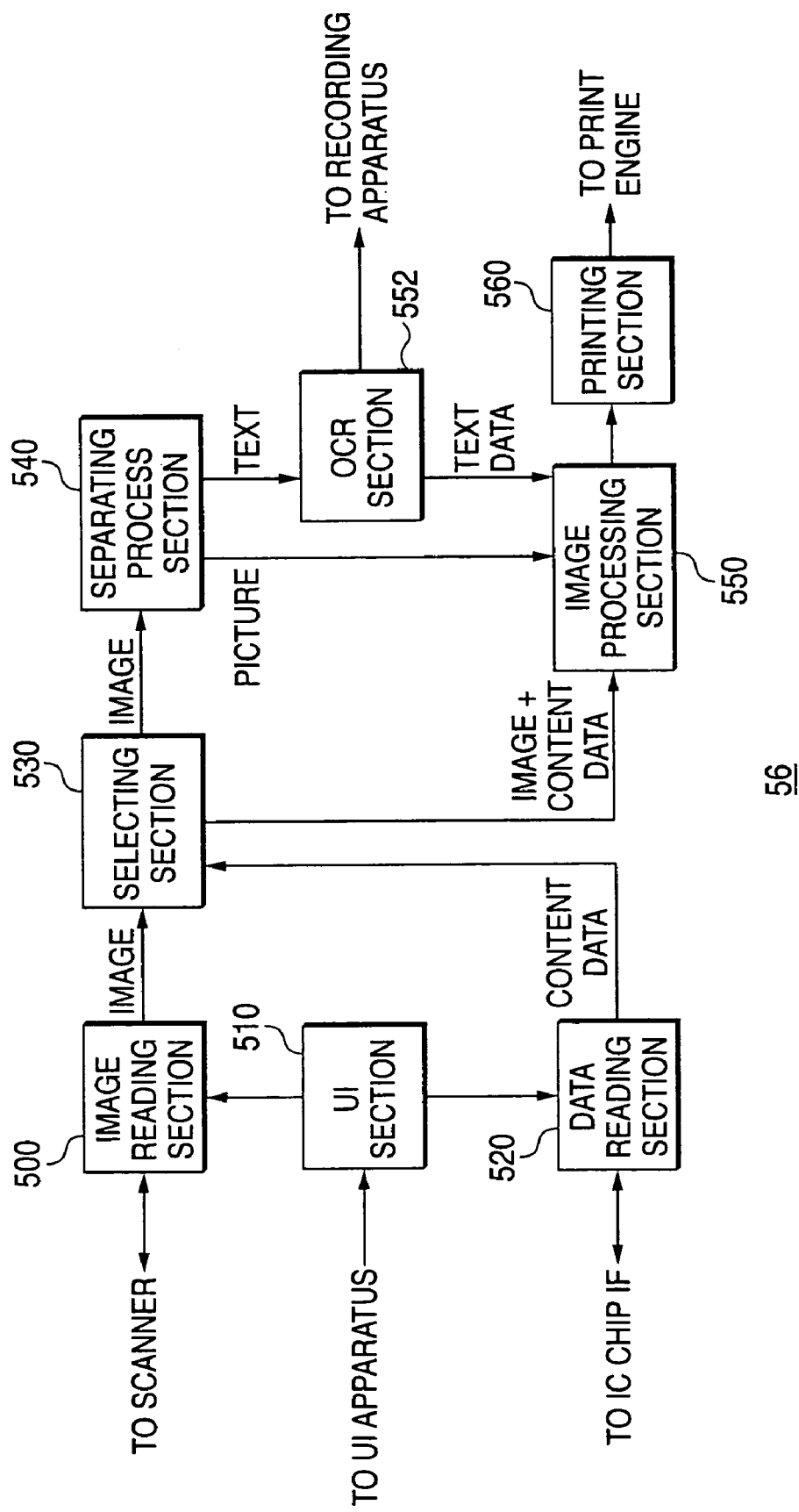
FIG. 14 is a diagram for indicating a structure of a fourth image processing program.

FIG. 14 is a diagram for showing a structure of a fourth image processing program 56.

As shown in FIG. 14, the fourth image processing program 56 employs such a structure that the selecting section 530 of the third image processing program 54 shown in FIG. 12 is moved to a position between the image reading section 500 and the separating process section 540, and the contents comparing section 580 is deleted from the structure of the third image processing program 54.

In the fourth image processing program 56, when the data reading section 520 reads contents data, the selecting section 530 outputs both an image input from the image reading section 500 and the contents data input from the data reading section 520 to the image processing section 550, whereas in other cases, the selecting section 530 outputs the image input from the image reading section 500 to the separating process section 540.

In this case, the contents data corresponds to information (text data) indicating a predetermined image (for example, text image) displayed on an original paper 40.

In the following descriptions, it is taken as a specific example that the contents data indicates a preselected text image displayed on the original paper 40.

In other words, in the fourth image processing program 56, when the data reading section 520 reads the contents data is read from the IC chip 3, the image processing section 550 specifies a text image based upon the read contents data, and then synthesizes this specified text image with the image read from the original paper 40, whereas in other cases, the image processing section 550 produces text data based upon the image read from the original paper 40, and then reconstructs an image by using this produced text data.

Figure 15:
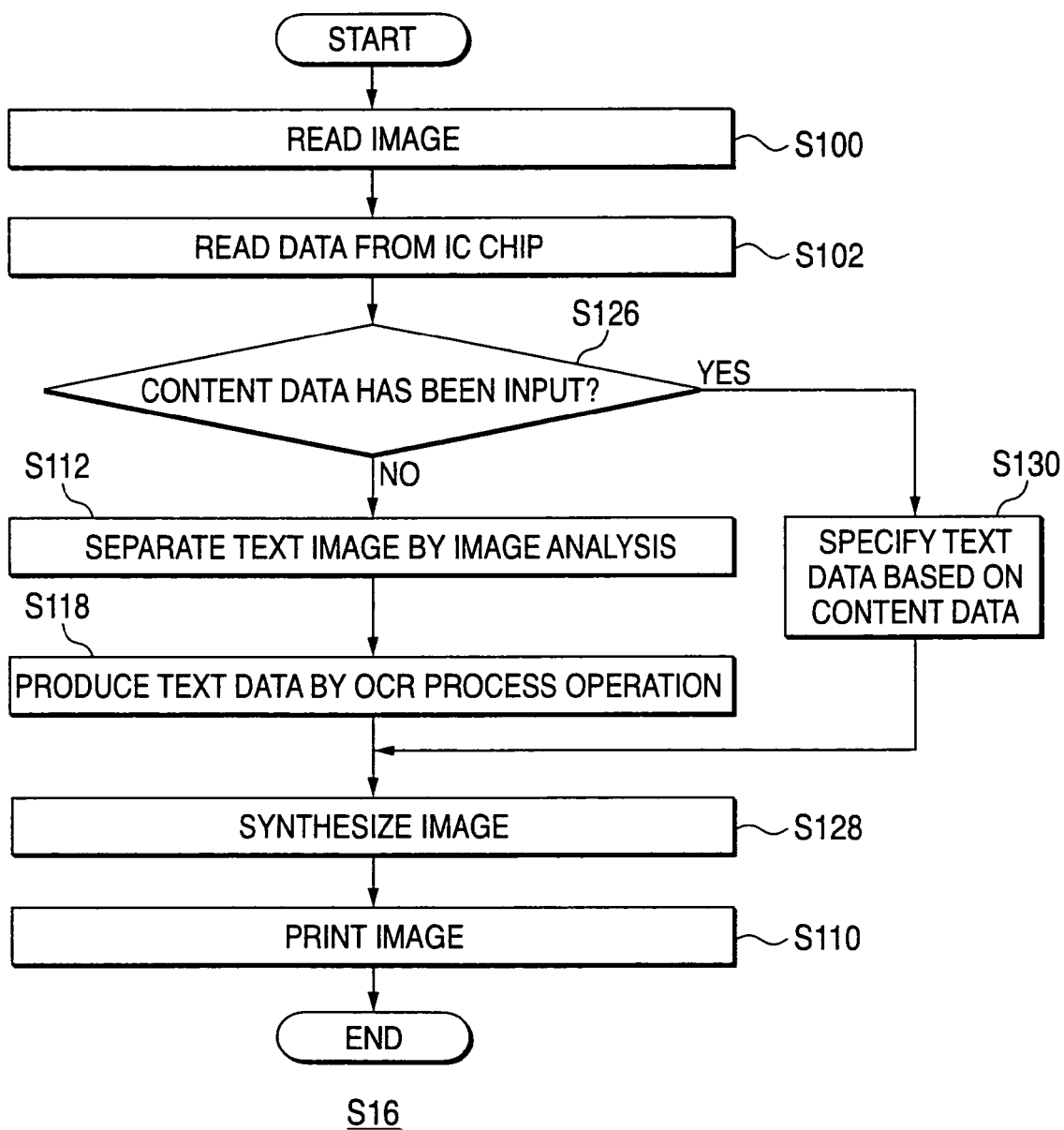
FIG. 15 is a flow chart for describing a fourth operation (S16) of a copying apparatus (fourth image processing program).

FIG. 15 is a flow chart for describing a fourth operation (step S116) of the copying apparatus 1 (fourth image processing program 56). It should also be understood that with regard to the process operations of the fourth operation shown in FIG. 15 similar to the process operations of the first to third operations shown in FIGS. 8, 10, and 13, the same reference numerals are allotted.

In the fourth operation of the copying apparatus 1, in a step 126 (S126), when contents data is input from the data reading section 520, the selecting section 530 outputs both an image input from the image reading section 500 and contents data input from the data reading section 520 to the image processing section 550 and then, the process operation is advanced to another process operation of a step S130, whereas in other cases, the selecting section 530 outputs the image input from the image reading section 500 to the separating process section 540 and then, the process operation is advanced to another process operation of a step S112.

In the step 130 (S130), the image processing section 550 specifies a text image (font, size of character, color of character, position to be displayed etc.) based upon the contents data. Subsequently, the image processing section 550 synthesizes the specified text image with the image input from the selecting section 530 (S128).

On the other hand, in the step 112 (S112), the separating unit 540 separates the image input from the selecting section 530 into a character and a picture and then, outputs these separated character and picture to the image processing section 550 and the OCR section 552.

In the step 118 (S118), the OCR section 552 recognizes a character from the text image input from the separating process section 540 and then, outputs the text data of the recognized character to the image processing apparatus 550 and the recording apparatus 24.

Subsequently, the image processing section 550 synthesizes the text data of the recognized character with the picture image separated by the separating process section 540 (S128).

It should also be noted that the text data recorded on the recording apparatus 24 may be displayed on, for example, the UI apparatus 26 so as to be utilized in confirming/editing operations of the character content by the user.

Finally, similar to the case explained in FIG. 8, the printing section 560 prints the image input from the image processing section 550 (S110).

As described above, in the fourth image processing program 56, in such a case that the contents data is read from the IC chip 3, a part of the image, which is to be printed, is formed based upon the read contents data, whereas in other cases, the text data can be produced based upon such a text image which has been separated into the character and the image.

The produced text data is recorded on the recording apparatus 24 and the like. When the original paper 40 is again processed in the copying apparatus 1, this recorded text data may be read from the recording apparatus 24 so as to be utilized. When the IC chip 3 is in a data writable condition, the fourth image processing program 56 may record the produced text data in the IC chip 3.

As previously explained, in accordance with the image processing system and the image processing method of the present invention, the process operations can be carried out which are adapted with respect to the text image and the picture image contained in the image, while utilizing such a semiconductor chip from which the data stored thereinto may be read in the non-contact manner.

What is claimed is:

1. A method comprising using a computer to perform the steps of:

reading area data and attribute data from a non-contact memory attached to an original document, the area data indicating an area of an image display member in which at least one sort of image is displayed, and the attribute data indicating attributes of the at least one sort of image;

supplying the area data and the attribute data to an external of the image display member;

reading the displayed image;

separating the at least one sort of image from the read displayed image on the basis of the supplied area data; and performing an image processing with respect to the separated at least one sort of image in response to the attributes of the at least one sort of image on the basis of the supplied attribute data.

2. A non-transitory computer readable storage medium having stored therein a computer program for causing a computer of an image process apparatus to execute a process, comprising:

reading area data and attribute data from a non-contact memory attached to an original document, the area data indicating an area of an image display member in which at least one sort of image is displayed, and the attribute data indicating attributes of the at least one sort of image;

supplying the area data and the attribute data to an external of the image display member;

reading an image displayed on the image display member;

separating the at least one sort of image from the read displayed image on the basis of the supplied area data; and performing an image processing with respect to the separated at least one sort of image in response to the attribute of the at least one sort of image on the basis of the supplied attribute data.

\* \* \* \* \*